United States Patent [19]

Nakane

[11] Patent Number: 5,375,110
[45] Date of Patent: Dec. 20, 1994

[54] OPTICAL DATA READING APPARATUS HAVING MEANS FOR DETECTING DATA DEGRADATION RESULTING FROM DUST COVERNG THE OPTICAL PICK UP HEAD

[75] Inventor: Hiroshi Nakane, Kanagawa, Japan
[73] Assignee: Kabushiki Kaisha Toshiba, Kanagawa, Japan
[21] Appl. No.: 123,850
[22] Filed: Sep. 9, 1993

Related U.S. Application Data

[63] Continuation of Ser. No. 908,811, Jul. 8, 1992, abandoned, which is a continuation of Ser. No. 399,112, Aug. 25, 1989, abandoned.

[30] Foreign Application Priority Data

Aug. 31, 1988 [JP] Japan .................. 63-217802

[51] Int. Cl.$^5$ .................................. G11B 7/00
[52] U.S. Cl. ........................ 369/47; 369/54; 369/44.25
[58] Field of Search .......... 369/54, 53, 58, 59, 369/111, 116, 279, 46.25, 44.32, 69, 47, 44.34, 48, 46.26, 46.37

[56] References Cited

U.S. PATENT DOCUMENTS

| 4,750,163 | 5/1989 | Yamamiya et al. | 369/54 |
| 4,961,182 | 10/1990 | Saito et al. | 369/124 |
| 4,991,159 | 2/1991 | Tomoda et al. | 369/19 |
| 5,027,339 | 5/1991 | Yoda et al. | 369/54 |
| 5,051,972 | 11/1991 | Yamamaro | 369/32 |

FOREIGN PATENT DOCUMENTS

| 84903660.3 | 11/1985 | European Pat. Off. . |
| 60-261044 | 6/1984 | Japan . |
| 59-139145 | 8/1984 | Japan . |

Primary Examiner—Tommy P. Chin
Assistant Examiner—Robert Chevalier
Attorney, Agent, or Firm—Finnegan, Henderson, Farabow, Garrett & Dunner

[57] ABSTRACT

An optical data reading apparatus for reading data stored in an optical record disc includes an optical pickup head for transducing an optical signal from the optical record disc to an electrical signal, a detector for detecting the level of the electrical signal, a source for supplying a reference signal representative of a minimum acceptable level for the electrical signal, a comparator for continuously comparing the level of the electrical signal and the reference signal and outputting a comparison signal when the level of the electrical signal is less than the reference signal and a warning device responsive to the comparison signal to indicate that the level of the electrical signal is below the minimum acceptable level.

13 Claims, 5 Drawing Sheets

11e

| 11b | 11a |
|---|---|
| 11d | 11c |

11f

OPTICAL DATA READING APPARATUS HAVING MEANS FOR DETECTING DATA DEGRADATION RESULTING FROM DUST COVERNG THE OPTICAL PICK UP HEAD

This application is a continuation of application Ser. No. 07/908,811, filed Jul. 8, 1992, now abandoned, which is a continuation of Ser. No. 07/399,112, filed Aug. 25, 1989, abandoned.

FIELD OF THE INVENTION

The present invention relates generally to an optical data reading apparatus, and more particularly, to a warning system for a data degradation occurring in an optical data reading apparatus.

BACKGROUND OF THE INVENTION

An optical data reading apparatus, e.g., a CD-ROM (Compact Disc type Read Only Memory) system, has been used in data processing systems, such as computers or word processors, as an external data memory system. In the CD-ROM system, a CD-ROM optically stores data. The data stored in the CD-ROM is read by the CD-ROM system and then supplied to the computers, the word processors and the like. The data stored in the CD-ROM is read by the CD-ROM system without mechanical contact to the CD-ROM.

Thus, the CD-ROM system has a short access time to access desired data, similar to the access time of conventional magnetic memory discs such as floppy discs. The CD-ROM system has a higher durability in comparison to the magnetic memory discs. Due to the above advantages, the CD-ROM system has been used in many fields, e.g., video image memories, data memories of CAD/CAM systems, data memories of electronic publishing systems, etc. in addition to computers and word processors.

Optical discs, e.g., the CD-ROMS, are broadly classified, according to the type of data recording and/or reproduction, into a reflection pit type, a phase shift type, and an optical/magnetic transducing type. However, in all the types a reflection light given from the optical discs is applied to an optical pickup head provided in the optical data reading apparatus. The reflection light is photoelectrically converted into an electrical signal. The electrical signal is suitably processed by a signal processing section in the optical data reading apparatus.

If the optical pickup head is covered with dust, the reflection light applied to the optical pickup head decreases so that the electrical signal output from the optical data reading apparatus also decreases. This causes errors or makes difficult the access operation of the optical discs, causing the optical data reading apparatus to work incorrectly. Such a problem may be caused by dust contained in the environmental air which is taken into the optical data reading apparatus. The dust gradually covers the optical pickup head. This problem occurs very often if the optical data reading apparatus is provided with a forced air ventilated cooling system.

To solve the problem, a user or an operator of the optical data reading apparatus must clean the optical pickup head. However, it is difficult for the operator to distinguish whether the problem is caused by dust or by other causes because many other causes as well as dust raise similar problems, e.g., the errors and the difficulty of accessing desired data. Therefore, the operator must try many possible solutions solving a problem, including cleaning the optical pickup head. However, cleaning is futile if the problem is not caused by dust on the optical pickup head. Further, frequent and unnecessary cleanings may injure the optical pickup head.

SUMMARY OF THE INVENTION

It is, therefore, an object of the present invention to provide an optical data reading apparatus which is able to warn of data degradation occurring in an optical data reading apparatus caused by dust covering the optical pickup head of the optical data reading apparatus.

In order to achieve the above object, an optical data reading apparatus according to one aspect of the present invention includes an optical pickup head for transducing an optical signal from the optical record disc to an electrical signal, a detector for detecting the level of the electrical signal, a source for supplying a reference signal representative of a minimum acceptable level for the electrical signal, a comparator for comparing the level of the electrical signal and the reference signal and outputting a comparison signal when the level of the electrical signal is less than the reference signal and a warning device responsive to the comparison signal to indicate that the level of the electrical signal is below the minimum acceptable level.

An optical data reading apparatus for reading data stored in an optical record disc according to another aspect of the present invention includes an optical pickup head for transducing an optical signal from the optical record disc to an electrical signal, a decoder for decoding a PCM data from the electrical signal, a detector for detecting the data error rate of the PCM data, a source for supplying a reference signal representative of a maximum acceptable data error rate, a comparator for comparing the data error rate of the PCM data and the reference signal and outputting a comparison signal when the data error rate of the PCM data exceeds the reference signal and a warning device responsive to the comparison signal to indicate that the data error rate of the PCM data is above the maximum acceptable data error rate.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figures 1, 3:
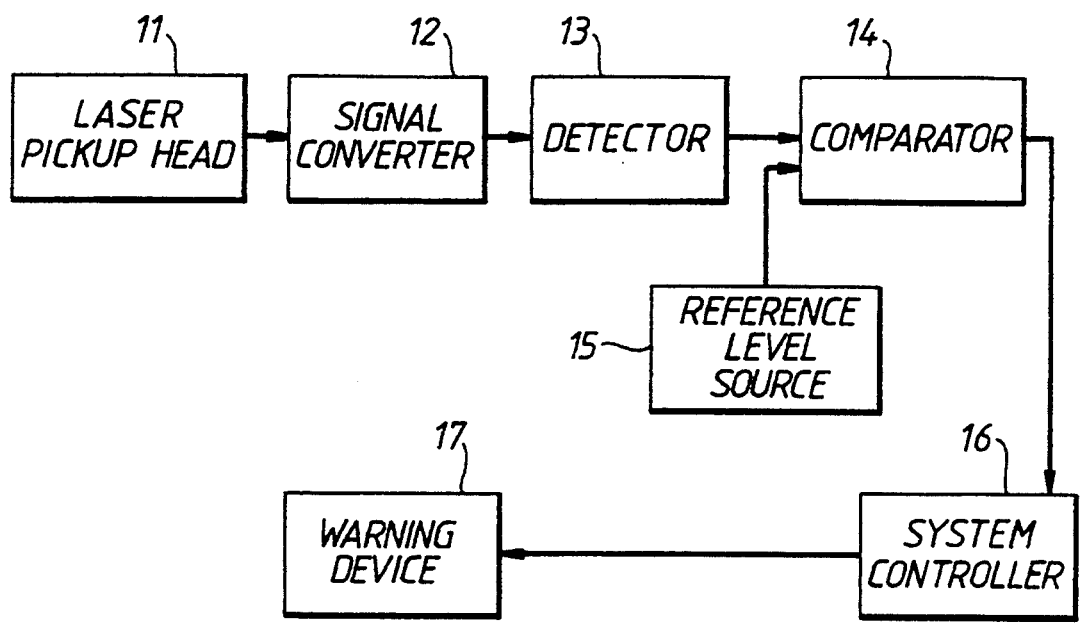
FIG. 1 is a block diagram showing an optical data reading apparatus according to the present invention.
FIG. 3 is a diagrammatical view showing a typical optical pickup head.

The present invention will be described in detail with reference to the FIGS. 1 through 9. Throughout the drawings, like reference numerals or letters will be used to designate like or equivalent elements for simplicity of explanation.

Referring now to FIG. 1, a first embodiment of optical data reading apparatus according to the present invention will be described in detail. In FIG. 1, a typical example of optical pickup heads, e.g., a laser pickup head 11 optically reads memory data recorded on an optical memory disc, e.g., a CD-ROM (not shown). When the laser pickup head 11 is covered with dust, the photoelectric conversion efficiency of the laser pickup head 11 lowers. Thus, the signal generated by the laser pickup head 11 weakens due to the low photoelectric conversion efficiency of the laser pickup head 11.

The pickup signal is applied to a signal converter 12. The signal converter 12 converts the pickup signal to a prescribed signal. The prescribed signal obtained from the signal converter 12 is also weak because of the weak pickup signal. The prescribed signal is applied to a detector 13. The detector 13 detects the intensity of the prescribed signal so that an intensity signal is produced.

The intensity signal is applied to the first input terminal of a comparator 14. The second input terminal of the comparator 14 is coupled to a reference level source 15. The reference level source 15 supplies a prescribed reference level to the second input terminal of the comparator 14. The reference level is set to a value equal to a minimum value required for proper operation of the optical data reading apparatus.

The comparator 14 compares the intensity signal applied to the first input terminal with the reference level applied to the second input terminal. When the laser pickup head 11 is covered with a prescribed amount of dust, the intensity signal lowers below the reference level. At this time, the comparator 14 outputs a comparison signal. The comparison signal is applied to a system controller 16.

The system controller 16 applies a prescribed control signal to a warning device 17 in response to the comparison signal. The warning device 17 carries out a prescribed warning operation in response to the control signal applied from the system controller 16. Then the operator is alerted by the warning operation that the laser pickup head 11 is heavily covered with dust. Thus, the operator can clean the laser pickup head 11.

The electrical signal output from the signal converter 12 may be any signal, which can be obtained by processing the pickup signal output from conventional optical pickup heads, e.g., a main-beam signal, a focus error signal, a tracking error signal, or a sub-beam signal. The main-beam signal is a signal representing an entire amount of reflection light of a main-beam radiated from the laser pickup head 11 to the CD-ROM. The sub-beam signal is a signal representing an entire amount of reflection light of two sub-beams radiated from the laser pickup head 11 to the CD-ROM, when the laser pickup head 11 is of a conventional 3-beam type.

Figure 2:
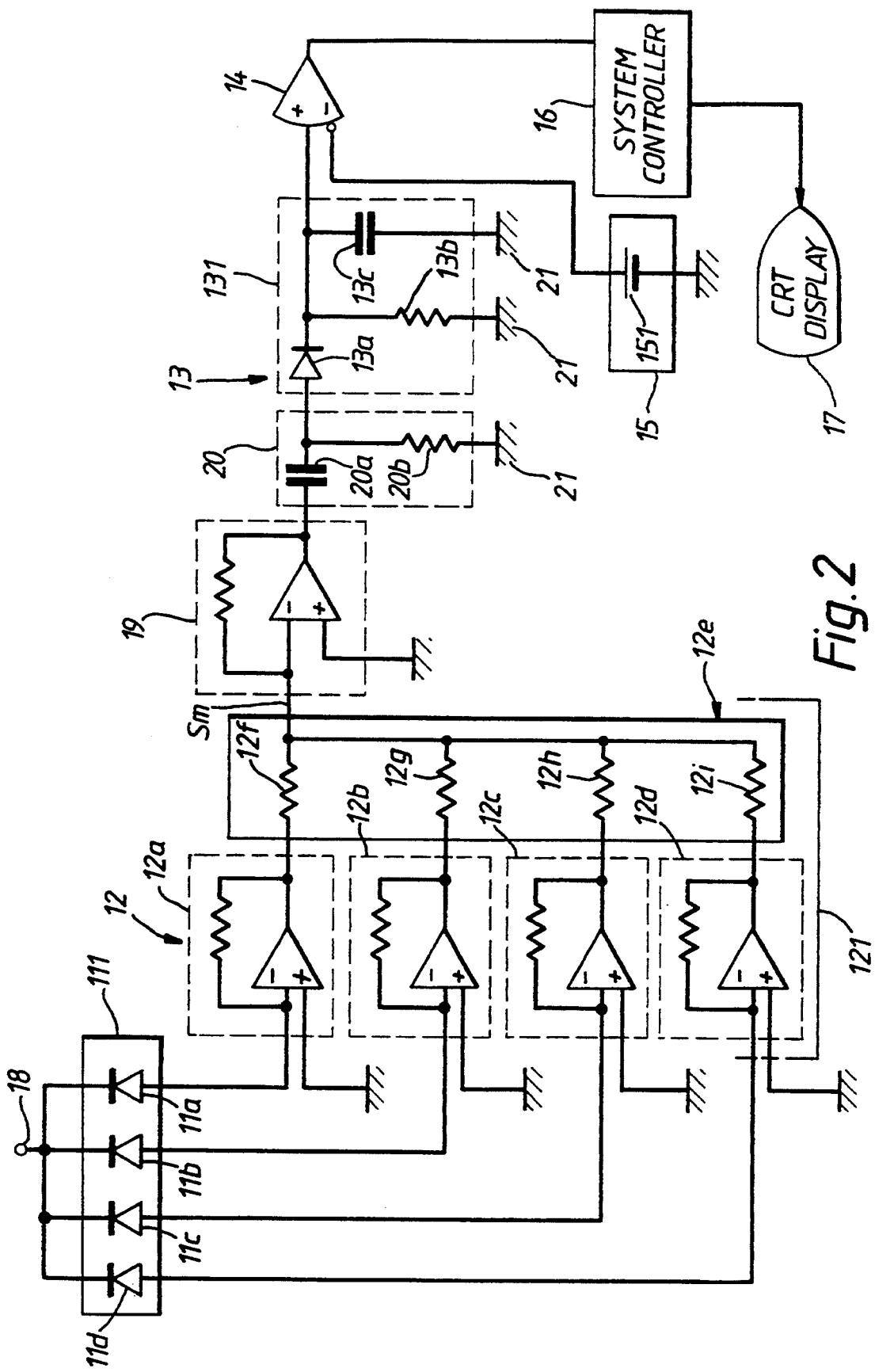
FIG. 2 is a circuit diagram showing a first embodiment applied to the optical data reading apparatus of FIG. 1.

Referring now to FIG. 2, a circuit applied to the optical data reading apparatus of FIG. 1 will be described in detail. FIG. 2 shows detailed circuit constructions of the laser pickup head 11, the signal converter 12, the detector 13 and the reference level source 15, as well as the block circuits of the comparator 14, the system controller 16 and the warning device 17. The circuit, as shown in FIG. 2, is designed to use a main-beam signal Sm as the electrical signal.

In FIG. 2, the laser pickup head 11 includes a typical 3-beam type 4-sectioned photo-sensor 111 comprising four photo-diodes 11a, 11b, 11c and 11d. The 3-beam type 4-sectioned photo-sensor 111 further includes two photo-diodes 11e and 11f other than the photo-diodes 11a, 11b, 11c and 11d, as shown in FIG. 3. FIG. 3 diagrammatically shows an arrangement of the photo-diodes 11a through 11f provided in the 3-beam type 4-sectioned photo-sensor 111.

The signal converter 12 includes a main-beam signal generating circuit 121. The main-beam signal generating circuit 121 comprises four amplifiers 12a, 12b, 12c and 12d and an adder 12e. The detector 13 includes an amplitude detector 131. The amplitude detector 131 comprises a diode 13a, a resistor 13b and a capacitor 13c. The reference level source 15 includes a DC source 151 with a DC voltage equal to the reference level.

In the 3-beam type 4-sectioned photo-sensor 111, the cathodes of the photo-diodes 11a, 11b, 11c and 11d are commonly coupled to a power supply source 18. Their anodes are coupled to input terminals of the amplifiers 12a, 12b, 12c and 12d of the main-beam signal generating circuit 121, respectively. Electrical wirings of the photo-diodes 11e and 11f will be described later in reference to another example of the signal converter 12.

Output terminals of the amplifiers 12a, 12b, 12c and 12d are coupled to the adder 12e. The adder 12e includes four resistors 12f, 12g, 12h and 12i. Each one end of the resistors 12f, 12g, 12h and 12i is coupled to the output terminals of the amplifiers 12a, 12b, 12c and 12d. Each another end of the resistors 12f, 12g, 12h and 12i are commonly coupled to the input terminal of the amplitude detector 131 through an amplifier 19 and high pass filter 20. Each of the amplifiers 12a, 12b, 12c and 12d of the main-beam signal generating circuit 121 and the amplifier 19 is comprised of a typical operational amplifier, as shown in FIG. 2.

The high pass filter 20 includes a capacitor 20a and a resistor 20b like a typical high pass filter. That is, the capacitor 20a is coupled in series between the input and output terminals of the high pass filter 20. The resistor 20b is coupled between the output terminal of the high pass filter 20 and a reference potential source 21. In the amplitude detector 131, the diode 13a is coupled in series between the input and output terminals of the amplitude detector 131. The resistor 13b and the capacitor 13c are coupled in parallel between the output terminal of the amplitude detector 131 and the reference potential source 21.

Each of the photo-diodes 11a, 11b, 11c and 11d constitutes a quaternary element of the 4-sectioned photo sensor 111. Pickup signals transduced in the photo-diodes 11a, 11b, 11c and 11d are applied to the amplifiers 12a, 12b, 12c and 12d of the main-beam signal generating circuit 121. Output signals of the amplifiers 12a, 12b, 12c and 12d are added by the adder 12e. Thus, an electrical signal, i.e., a main-beam signal Sm is output from the adder 12e. The main-beam signal Sm is applied into the high pass filter 20. The high pass filter 20 removes a DC component of the main-beam signal Sm. Thus, AC components of the main-beam signal Sm are applied into the amplitude detector 131.

In the amplitude detector 131, the diode 13a constitutes an amplitude detecting element. The register 13b and the capacitor 13c constitute a smoothing circuit. Thus, the diode 13a detects the AC components of the main-beam signal Sm. An amplitude signal detected by the diode 13a is smoothed by the smoothing circuit comprised of the resistor 13b and the capacitor 13c. Thus, an intensity signal of the main-beam signal Sm is obtained by the amplitude detector 131. The intensity signal is applied to the first input terminal of the comparator 14. The comparator 14 compares the intensity signal with the DC voltage, i.e., the reference level supplied to the second input terminal thereof.

Figure 4:
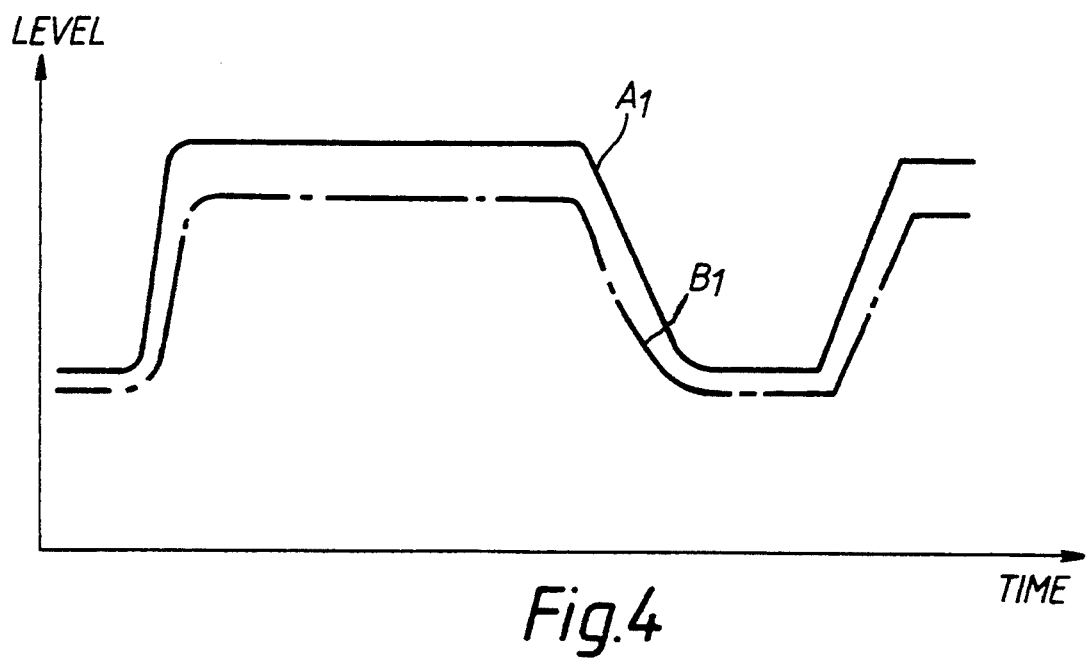
FIGS. 4 and 5 are timing charts showing the operation of the optical data reading apparatus of FIG. 2.
Figure 5:
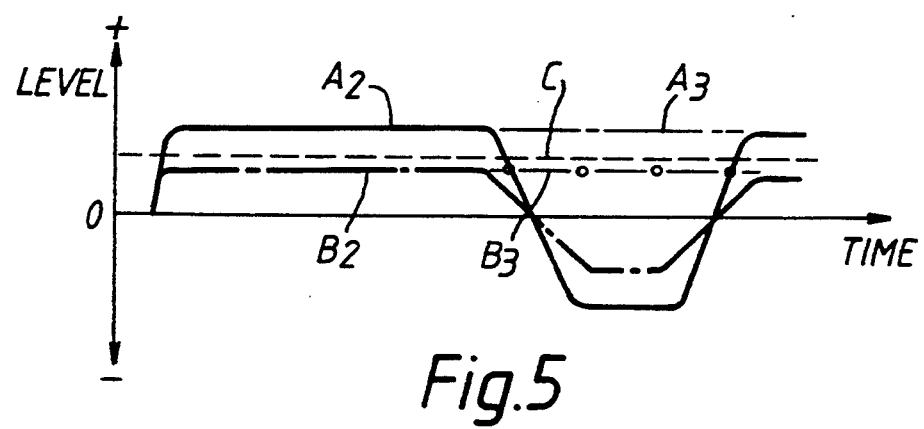

Referring now to FIGS. 4 and 5, the operation of the optical data reading apparatus of FIG. 2 will be described. The 3-beam type 4-sectioned photo-sensor 111 includes optical elements and such as a laser source, an objective lens (not shown) as well as the photo-diodes 11a, 11b, 11c and 11d like a typical optical pickup head. The main-beam signal generating circuit 121 outputs a main-beam signal as shown by a graph A1 in FIG. 4, when all of the optical elements are not covered with dust.

The main-beam signal as shown by the graph A1 in FIG. 4 has a large variation, in amplitude. When any one or more of the optical elements are covered with dust, a main-beam signal output from the adder 12e is weakened, as shown by a graph B1 in FIG. 4. The latter main-beam signal as shown by the graph B1 has a small variation in amplitude.

The main-beam signal as shown by the graph A1 or B1 is applied to the high pass filter 20. The high pass filter 20 outputs an AC component of the main-beam signal A1 or B1. Thus, AC components as shown by graphs A2 and B2 in FIG. 5 are obtained corresponding to the main-beam signal A1 and B1. The AC components A2 and B2 are applied to the amplitude detector 131. The amplitude detector 131 detects the AC components A2 and B2. Thus, intensity signals as shown by graphs A3 and B3 in FIG. 5 are obtained corresponding to the AC components A2 and B2.

If the level of the intensity signal B3 is below the DC voltage of the DC source 151 as shown by a graph C in FIG. 5, the comparator 14 produces a control signal. The DC voltage of the DC source 151 is set to a value equal to a minimum value required for the proper operation of the first embodiment of the optical data reading apparatus. The control signal is applied to the system controller 16.

The system controller 16 drives the warning device 17, e.g., a CRT display, in response to the control signal. Then, the operator can take necessary action to restore the operation of the laser pickup head 11, e.g., the cleaning of the laser pickup head 11, based on the warning operation carried out by the warning device 17 or the CRT display.

The first embodiment of the optical data reading apparatus, as shown in FIG. 2, readily warns the operator of the necessity of cleaning for the laser pickup head 11.

Figure 6:
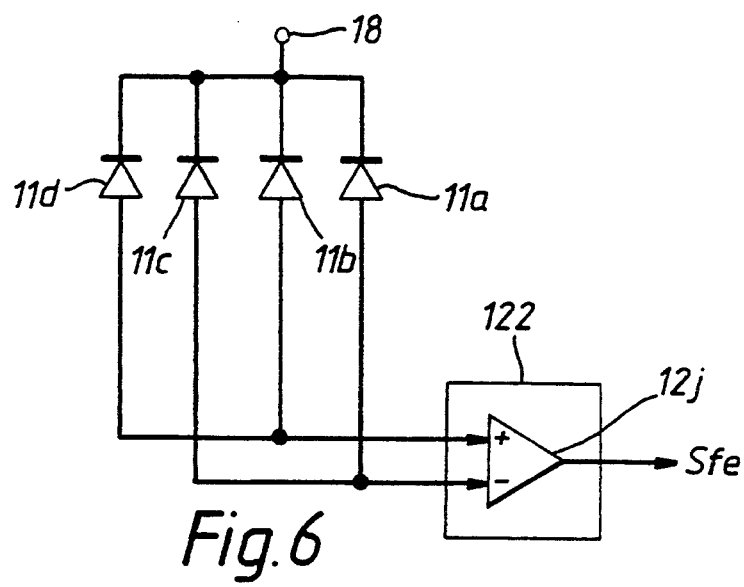
FIG. 6 is a circuit diagram showing one example of electrical signal generating circuits applied to the optical pickup head of FIG. 3.
Figure 7:
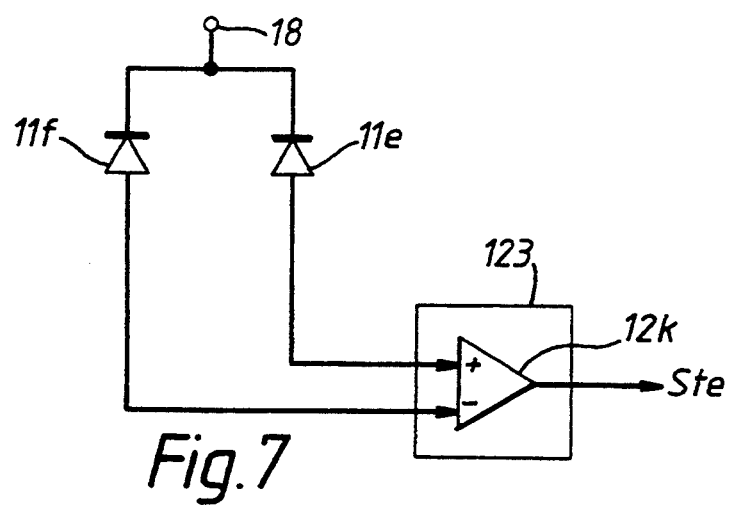
FIG. 7 is a circuit diagram showing another example of electrical signal generating circuits applied to the optical pickup head of FIG. 3.
Figure 8:
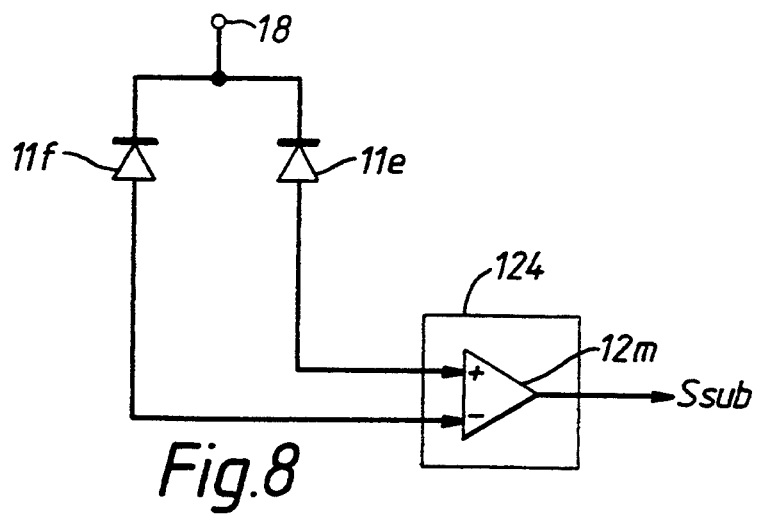
FIG. 8 is a circuit diagram showing still another example of electrical signal generating circuits applied to the optical pickup head of FIG. 3.

Referring now to FIGS. 6, 7 and 8, three other examples of the signal converter 12 will be described in brief.

FIG. 6 shows a focus error signal generating circuit 122 which is adapted for the 3-beam type 4-sectioned photo-sensor 111 as a second example of the signal converter 12. FIG. 7 shows a tracking error signal generating circuit 123 which is adapted for the 3-beam type 4-sectioned photo-sensor 111 as a third example of the signal converter 12. FIG. 8 shows a sub-beam signal generating circuit 124 which is adapted for the 3-beam type 4-sectioned photo-sensor 111 as a third example of the signal converter 12.

In FIG. 6, the focus error signal generating circuit 122 includes a subtractor 12j. One input terminal of the subtractor 12j is coupled to the anodes of the photo-diodes 11b and 11d. Another input terminal of the subtractor 12j is coupled to the anodes of the photo-diodes 11a and 11c. The photo-diodes 11a and 11c make an orthogonal pair, as shown in FIG. 3. The photo-diodes 11b and 11d make another orthogonal pair, as shown in FIG. 3.

As is well known in the art, the circuit arrangement, as shown in FIG. 6, operates to produce a focus error signal Sfe. Thus, the subtractor 12j outputs the focus error signal Sfe. The focus error signal Sfe output from the subtractor 12j is applied to the amplitude detector 131 (see FIG. 2) in place of the main-beam signal Sm as referred above. The focus error signal Sfe is also degraded by dust when the laser pickup head 11 is heavily covered with dust.

In FIG. 7, the tracking error signal generating circuit 123 includes a subtractor 12k. One input terminal of the subtractor 12k is coupled to the anode of the photo-diode 11e (see FIG. 3). Another input terminal of the 12k is coupled to the anode of the photo-diode 11f (see FIG. 3). The photo-diodes 11e and 11f are arranged to detect light reflected at the edges of the record track of the CD-ROM.

As is well known in the art, the circuit arrangement as shown in FIG. 7 operates to produce a tracking error signal Ste. Thus, the subtractor 12k outputs the tracking error signal Ste. The tracking error signal Ste output from the subtractor 12k is applied to the amplitude detector 131 (see FIG. 2) in place of the main-beam signal Sm as referred above. The tracking error signal Ste is also degraded by dust when the laser pickup head 11 is heavily covered with dust.

In FIG. 8, the sub-beam signal generating circuit 124 includes an adder 12m. One input terminal of the adder 12m is coupled to the anode of the photo-diode 11e (see FIG. 3). Another input terminal of the adder 12m is coupled to the anode of the photo-diode 11f (see FIG. 3). The photo-diodes 11e and 11f are arranged to detect light reflected at the edges of the record track of the CD-ROM.

As is well known in the art, the circuit arrangement as shown in FIG. 8 operates to produce a sub-beam signal Ssub. Thus, the adder 12m outputs the sub-beam signal Ssub. The sub-beam signal Ssub output from the adder 12m is applied to the amplitude detector 131 (see FIG. 2) in place of the main-beam signal Sm as referred above. The sub-beam signal Ssub is also degraded by dust when the laser pickup head 11 is heavily covered with dust.

When any of these signals Sm, Sfe, Ste and Ssub is used, it is possible to warn the operator of reduced amount of light received at the laser pickup head.

Figure 9:
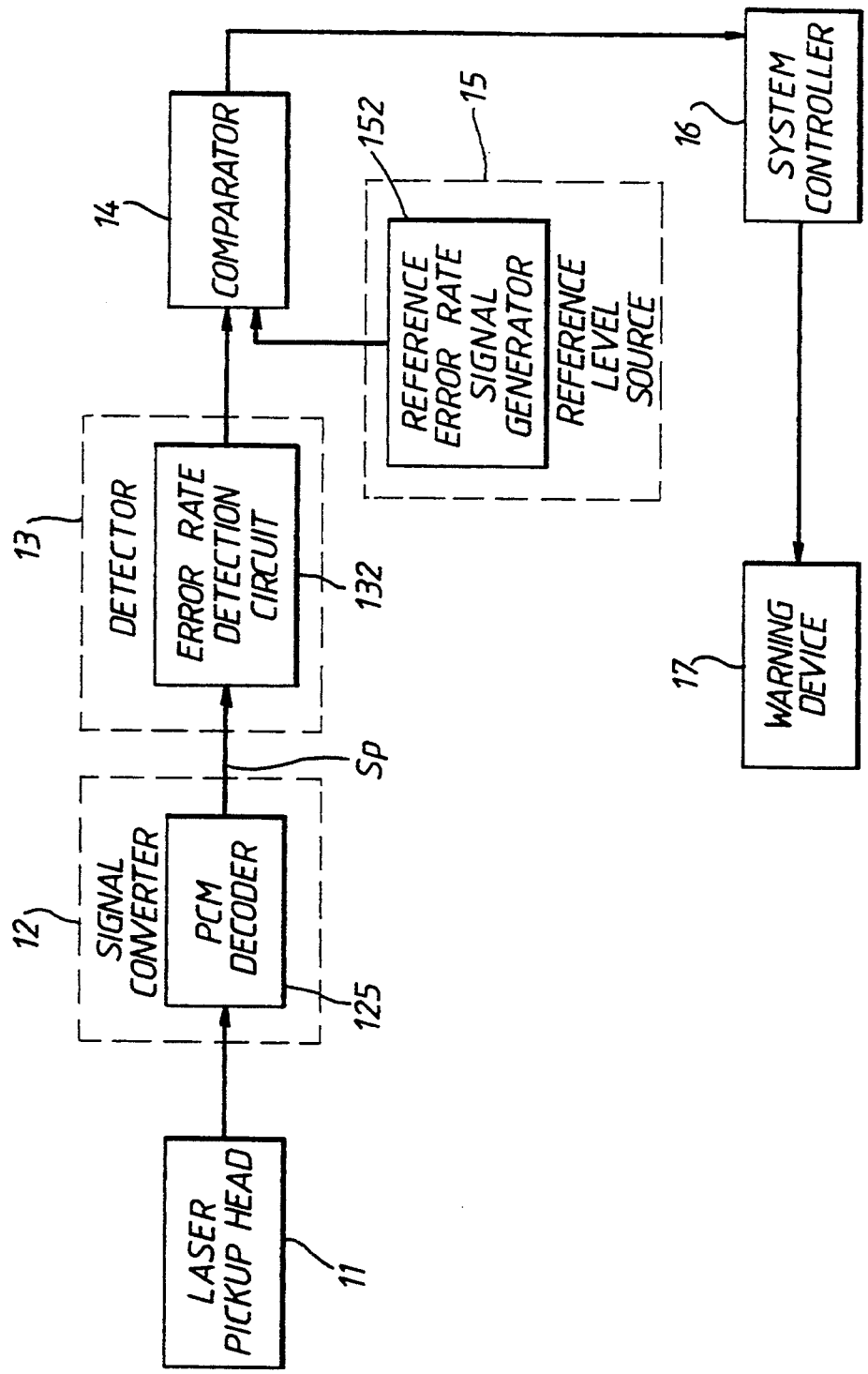
FIG. 9 is a circuit diagram showing a second embodiment applied to the optical data reading apparatus of FIG. 1.

Referring now to FIG. 9, a second embodiment of optical data reading apparatus according to the present invention will be described in detail. In FIG. 9, a laser pickup head 11 optically reads memory data recorded on an optical memory disc, e.g., a CD-ROM (not shown). When the laser pickup head 11 is covered with dust, the photoelectric conversion efficiency of the laser pickup head 11 is lowered. Thus, the signal generated by the laser pickup head 11 becomes weak due to the low photoelectric conversion efficiency of the laser pickup head 11.

The pickup signal is applied to a signal converter 12. The signal converter 12 includes a PCM decoder 125 for decoding a PCM signal Sp from the pickup signal output from the laser pickup head 11. The PCM signal Sp output from the PCM decoder 125 is applied to a detector 13. The detector 13 includes an error rate detection circuit 132. The error rate detection circuit 132 detects an error rate of the PCM signal Sp so that an error rate signal is produced.

The error rate signal is applied to the first input terminal of a comparator 14. The second input terminal of the comparator 14 is coupled to a reference level source 15. The reference level source 15 includes a reference error rate signal generator 152. The reference error rate signal generator 152 supplies a prescribed error rate value to the second input terminal of the comparator 14. The reference error rate is set to a value equal to a minimum value required for proper operation of the optical data reading apparatus.

The comparator 14 compares the error rate signal applied to the first input terminal with the reference error rate signal applied to the second input terminal. When the laser pickup head 11 is covered with a prescribed amount of dust, errors in the PCM signal Sp increase over the reference error rate. At the time, the comparator 14 outputs a comparison signal. The comparison signal is applied to a system controller 16.

The system controller 16 applies a prescribed control signal to a warning device 17 in response to the comparison signal. The warning device 17 carries out a prescribed warning operation in response to the control signal applied from the system controller 16. Then the operator is informed by the warning operation of the laser pickup head 11 being heavily covered with dust. Thus, the operator can clean the laser pickup head 11.

According to the embodiments of the present invention, the operator is alerted that the laser pickup head 11 is heavily covered with dust when the warning device 17 operates. Then the operator can promptly clean the laser pickup head 11, without first attempting other repair measures.

The warning device is not necessarily limited to those, such as the CRT display, presented in the embodiments described above. For example, a liquid crystal display, a lamp or a buzzer may be used.

Further, the intensity signal or the error rate signal is compared with only one reference level or value. However, it is possible to detect the soiled state of the optical pickup head at many steps by providing many reference levels or values to the comparator.

As described above, the present invention can provide an extremely preferable optical data reading apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An optical data reading apparatus for reading with an optical pickup head recorded data stored in an optical record disc, comprising:

means for generating an electrical signal from the recorded data stored in the optical record disc;

means for processing the generated electrical signal to obtain a data signal representative of the generated electrical signal, said process means including a circuit for smoothing the generated electrical signal to obtain the data signal having a substantially constant level;

means for supplying a reference signal representative of a minimum acceptable level for the data signal;

means for continuously comparing the level of the data signal with the reference signal while the optical pick up head is reading the recorded data to determine whether the generated electrical signal has become weak due to an attenuated photoelectric conversion efficiency of the optical pickup head by determining whether the data signal is within an acceptable level and for outputting a comparison signal when the data signal is not within the acceptable level; and means, responsive to the comparison signal, for visually indicating that the optical pickup head is covered with dust to an extent that it must be cleaned.

2. An optical data reading apparatus as in claim 1 further comprising an optical pickup head which reads the optical data stored in the optical record disc.

3. An optical data reading apparatus as in claim 2 wherein the level of the generated electrical signal is dependent upon the amount of light entering the optical pickup head from the optical record disc.

4. An optical data reading apparatus as in claim 1 wherein the generated electrical signal is a main beam signal generated by the generating means.

5. An optical data reading apparatus as in claim 1 wherein the generated electrical signal is a focus error signal generated by the generating means.

6. An optical reading apparatus as in claim 1 wherein the generated electrical signal is a tracking error signal generated by the generating means.

7. An optical data reading apparatus as in claim 1 wherein the generated electrical signal is a sub beam signal generated by the generating means.

8. An optical data reading apparatus as in claim 1 wherein:

the smoothing circuit comprises a resistor and a capacitor disposed in parallel.

9. An optical data reading apparatus as in claim 8 wherein:

the processing means includes a high pass filter for passing an alternating current component of the generated electrical signal.

10. An optical data reading apparatus as in claim 1 wherein:

the processing means includes a high pass filter for passing an alternating current component of the generated electrical signal.

11. A method for detecting and warning when an optical pickup head for reading recorded optical data in an optical data reading apparatus is covered with dust to an extent that it must be cleaned, comprising the following steps:
generating an electrical signal from the recorded optical data representing the signal output by the optical pickup head;
smoothing the generated electrical signal to obtain the data signal having a substantially constant level;
determining while the optical pick up head is reading the recorded optical data whether the generated electrical signal has become weak due to an attenuated photoelectric conversion efficiency of the optical pickup head by continuously comparing the data signal to a reference signal which represents a minimum acceptable level of the data signal; and
operating a warning device when the data signal is not within the acceptable level for the reference signal.

12. An optical reading apparatus having an optical pickup head for reading recorded data stored in an optical record disc, comprising:
means for generating an electrical signal from the recorded data stored in the optical record disc;
means for detecting a data error rate of the generated electrical signal and for producing an error rate signal representative of the detected data error rate;
means for supplying a reference signal representative of a maximum acceptable data error rate for the generated electrical signal;
means for continuously comparing the error rate signal with the reference signal while the optical pick up head is reading the recorded data to determine whether the generated electrical signal has become weak due to an attenuated photoelectric conversion efficiency of the optical pickup head and for generating a comparison signal; and
means responsive to the comparison signal for visually indicating that the error rate signal exceeds the reference signal, the visual indication being indicative of the optical pickup head being covered with dust to the extent that it must be cleaned.

13. A method for detecting and warning when an optical pickup head for reading data from an optical record disc is covered with dust to the extent that the optical pickup head must be cleaned, comprising the steps of:
generating a data signal from the optical pickup head representative of the data stored in the optical record disc;
detecting a data error rate of the generated electrical signal and generating an error rate signal;
generating a reference signal corresponding to a maximum acceptable data error rate;
continuously comparing the reference signal with the error rate signal while the optical pick up head is reading data from the optical record disc; and
operating a warning device when the error rate signal exceeds the reference signal.

* * * * *

UNITED STATES PATENT AND TRADEMARK OFFICE
CERTIFICATE OF CORRECTION

PATENT NO. : 5,375,110
DATED : December 20, 1994
INVENTOR(S) : Hiroshi NAKANE

It is certified that error appears in the above-indentified patent and that said Letters Patent is hereby corrected as shown below:

Claim 11, Column 9, Line 15 change "pick up" to --pickup--.

Claim 12, Column 10, Line 6, change "pick up to --pickup--.

On the title page, item [54] and col. 1, line 4, change "PICK UP" to

--PICKUP--.

Signed and Sealed this

Twentieth Day of June, 1995

Attest:

BRUCE LEHMAN

Attesting Officer

Commissioner of Patents and Trademarks